(12) United States Patent
Meyer et al.

(10) Patent No.: US 8,919,074 B2
(45) Date of Patent: Dec. 30, 2014

(54) TELESCOPIC TOWER ASSEMBLY AND METHOD

(75) Inventors: Max Meyer, East Ind. Est. (SG); Walter Althaus, East Ind. Est. (SG); Ferry Effendi, East Ind. Est. (SG); Nugroho Budi Juliadi, East Ind. Est. (SG); Româo Almeida, Faço de Arcos (PT); Jean Marie Laurens, St-Légier (CH); Pascal Burtet, St-Légier (CH)

(73) Assignee: VSL International AG, Koniz (CH)

( * ) Notice: Subject to any disclaimer, the term of this patent is extended or adjusted under 35 U.S.C. 154(b) by 0 days.

(21) Appl. No.: 13/382,341

(22) PCT Filed: Jul. 13, 2009

(86) PCT No.: PCT/EP2009/058896
§ 371 (c)(1),
(2), (4) Date: Mar. 14, 2012

(87) PCT Pub. No.: WO2011/006526
PCT Pub. Date: Jan. 20, 2011

(65) Prior Publication Data
US 2012/0159875 A1    Jun. 28, 2012

(51) Int. Cl.
| | |
|---|---|
| *E04B 1/00* | (2006.01) |
| *E04H 12/34* | (2006.01) |
| *E04H 12/18* | (2006.01) |
| *E04H 12/30* | (2006.01) |
| *F03D 1/00* | (2006.01) |
| *F03D 11/04* | (2006.01) |

(52) U.S. Cl.
CPC .............. *E04H 12/34* (2013.01); *E04H 12/182* (2013.01); *E04H 12/30* (2013.01); *F03D 1/001* (2013.01); *F03D 11/04* (2013.01); *F05B 2240/9151* (2013.01); *Y02E 10/728* (2013.01)

USPC ....................... 52/745.17; 52/123.1; 52/745.2

(58) Field of Classification Search
CPC ......... E04B 1/35; E04H 12/34; E04H 12/341; E04H 12/182
USPC ............ 52/122.1, 123.1, 127.1, 127.2, 173.1, 52/745.11, 745.17, 745.18, 745.2
See application file for complete search history.

(56) References Cited

U.S. PATENT DOCUMENTS 2,384,279 A * 9/1945 Calhoun .......................... 52/121
2,795,303 A * 6/1957 Muehlhause et al. ........... 52/121
(Continued)

FOREIGN PATENT DOCUMENTS

| EP | 1645701 A2 | 4/2006 |
|---|---|---|
| GB | 2451191 | 1/2009 |

(Continued)

OTHER PUBLICATIONS

International Search Report dated Apr. 14, 2010.

*Primary Examiner* — Basil Katcheves
*Assistant Examiner* — Joshua Ihezie
(74) *Attorney, Agent, or Firm* — Pearne & Gordon LLP (57) ABSTRACT

A method of constructing a tower structure by assembling a set of coaxial telescopic sections 2, 3a, 3b in position on site and then raising the assembled sections using hydraulic crawler jacks 8 and tendons 5. The telescopic sections are assembled or constructed in situ, starting with the inner section and then each subsequent section around the outside of the previously constructed sections. Each individual tower section may be cast in situ or assembled from multiple prefabricated segments. This method permits the construction of very tall structures while obviating the need for very large cranes. It also removes the design constraints on the height of the individual telescopic sections.

15 Claims, 10 Drawing Sheets

(56) References Cited

U.S. PATENT DOCUMENTS

| | | | | |
|---|---|---|---|---|
| 3,248,831 A * | 5/1966 | Jones | | 52/121 |
| 4,151,534 A * | 4/1979 | Bond | | 343/883 |
| 4,176,360 A * | 11/1979 | Leavy et al. | | 343/883 |
| 4,568,808 A * | 2/1986 | Thuries et al. | | 200/48 V |
| 4,785,309 A * | 11/1988 | Gremillion | | 343/883 |
| 5,101,215 A * | 3/1992 | Creaser, Jr. | | 343/883 |
| 5,168,679 A * | 12/1992 | Featherstone | | 52/118 |
| 6,046,706 A * | 4/2000 | Vargas | | 343/883 |
| 6,343,440 B1 * | 2/2002 | Ayers | | 52/40 |
| 6,614,125 B2 * | 9/2003 | Willis et al. | | 290/55 |
| 6,782,667 B2 * | 8/2004 | Henderson | | 52/116 |
| 7,191,569 B2 * | 3/2007 | Brown | | 52/293.3 |
| 7,195,216 B2 * | 3/2007 | Wang | | 248/157 |
| 7,207,777 B2 * | 4/2007 | Bervang | | 416/119 |
| 7,343,718 B2 * | 3/2008 | Foust et al. | | 52/745.17 |
| 7,568,315 B2 * | 8/2009 | Norwood | | 52/118 |
| 8,146,219 B2 * | 4/2012 | Monostory | | 29/55 |
| 8,191,322 B2 * | 6/2012 | Liestenfeltz et al. | | 52/212 |
| 8,297,025 B2 * | 10/2012 | Huynh et al. | | 52/745.17 |
| 8,381,460 B1 * | 2/2013 | McDermott | | 52/118 |
| 2004/0211148 A1 * | 10/2004 | Foust et al. | | 52/720.1 |
| 2005/0150721 A1 * | 7/2005 | Fujiwara et al. | | 182/48 |
| 2008/0209842 A1 * | 9/2008 | Montaner et al. | | 52/651.07 |
| 2009/0031639 A1 * | 2/2009 | Cortina/Cordero | | 52/40 |
| 2009/0211174 A1 * | 8/2009 | Henderson et al. | | 52/40 |

FOREIGN PATENT DOCUMENTS

| | | |
|---|---|---|
| WO | 2002046552 A1 | 6/2002 |
| WO | 03004870 A1 | 1/2003 |
| WO | 2008031912 A1 | 3/2008 |

* cited by examiner

TELESCOPIC TOWER ASSEMBLY AND METHOD

The present invention relates to the field of construction of tower-like structures and particularly, but not exclusively, to the assembly of pre-fabricated concrete towers for wind turbines and the like.

Tall tower structures, such as are commonly used for wind turbines, are often constructed of pre-cast segments of reinforced and/or pre-stressed concrete, which are then transported to the erection site, usually by road, and assembled by lifting the segments into position by crane. In the case of a tower having a circular cross-section, for example, each vertical section will be assembled from several arcuate segments. The bottom tower section will be assembled and erected first, after which the second, third and successive sections will be lifted into position using a crane. Each section is usually pre-assembled at ground level and then lifted whole into position on top of the previous section. Alternatively, the segments of a particular section may be lifted into position separately and then assembled on top of the previous section. Finally, the top section is lifted into position, followed by the generator assembly and the turbine rotor.

Towers for wind turbines may be as tall as 100 m, and plans for towers as tall as 160 m are envisaged, bearing generator units capable of producing many megawatts. The prior art construction techniques require the parts of the tower to be lifted using huge cranes, which must be at least as tall as the tower structure itself. The generator unit, which may weigh as much as 130 tonnes, must be lifted into position at the top of the structure. Generator units weighing up to 300 tonnes may eventually be required. Cranes which can safely lift such weights to such heights are extremely large and expensive, and the process of transporting such a crane to the site and assembling it is a huge task requiring specialist staff, heavy machinery and often the construction of roads much bigger than would be required for transporting the pre-fabricated tower pieces. A similarly giant crane is also required for any major maintenance work to the generator or the rotor, or if the tower needs to be dismantled. A crane capable of lifting a 130 tonne generator on to the top of one of the envisaged 160 m towers would be orders of magnitude larger and more expensive than those currently being used for 100 m towers. The height to which a tower can be built is therefore limited by the size of crane which will be required for its construction, and the erection of 160 m pre-fabricated towers has still to be realized.

UK patent application GB2451191 describes a telescopic tower erection method in which several pre-fabricated telescopic sections of a tower are fitted together horizontally at low level. The assembled telescopic sections are then winched together into an upright position, and the sections are then raised in turn, either by means of a crane or by jacking up each section against its outer neighbour using an arrangement of wall members and extendible jacks, such as powered screw jacks. In the jacking method, each vertical section is alternately supported and jacked up on its next outer section, so that the wall members form an extra supporting wall lining the inner surface of the next outer section. When the section being raised reaches its desired position, a supporting structure is fixed to the side walls of the outer section to support the underside of the inner section. Once all the vertical sections are extended into position in this way, the lining walls can be removed. The tower can be disassembled by reversing the operation.

The tower erection method disclosed in GB2451191 suffers from the following disadvantages, however. Firstly, the disclosed jacking method relies on supporting a flange at the bottom of each section on a ledge at the bottom of the previous section. This means that the sections must be raised in a particular order, since each successive inner section rests on its outer neighbour. Secondly, the interim supporting method of GB2451191 is exceedingly labour intensive, involving the construction and subsequent dismantling of an entire inner wall structure almost as large as the tower itself, something which may have a severe impact on the speed of construction and therefore on the overall programme of works. Thirdly, the jacking and supporting techniques are only suitable for structures in which all the walls of all the sections are substantially parallel. The present invention aims to solve these and other problems inherent in the prior art. In particular, the invention aims to provide a construction method and assembly which permits the tower sections to be assembled without a crane, or using a small crane just slightly taller than one section. Further objects of the invention are also to enable a much faster and more efficient raising of the tower sections, and to enable the use of tower sections having non-parallel walls. A further object of the invention is to provide a method and assembly which permit the raising of the tower sections in any order.

In order to achieve the above objects, a method is provided of erecting a structure on a site using a plurality of substantially coaxial telescopic sections, the method comprising the following steps:

a first step of placing or constructing an innermost one of said plurality of sections in position on the site, a second step of placing or constructing, in position on site, one or more substantially coaxial sections around said innermost section, so as to form two or more substantially coaxial telescopic sections, each of said coaxial telescopic sections having an inner and/or an outer coaxially adjacent section, a third step of fitting a plurality of jacking tendons between lower jacking points of a first one of said telescopic sections, and upper jacking points of a second one of said telescopic sections, said first and second telescopic sections being coaxially adjacent, a fourth step of attaching a tendon jack to one or more of said plurality of jacking tendons, a fifth step of operating the tendon jacks to apply tension to the jacking tendons (5) such that the weight of the first section is supported by the upper jacking points of the second section, and a sixth step of operating said tendon jacks to lift the first section with respect to the second section.

The method of the invention may also comprise a seventh step of securing a lower part of the first section to an upper part of the second section.

In one variant of the method of the invention the second step is performed so as to form three or more substantially coaxial telescopic sections comprising two or more pairs of coaxially adjacent sections, and the third to sixth or seventh steps are performed for each of the two or more pairs of coaxially adjacent sections.

As mentioned above, the method of the invention may be used for the erection of a tower for supporting a top-mounted element such as a wind-turbine generator unit or a water tank on an uppermost one of the telescopic sections, the method may also comprise an eighth step, performed before the sixth step, of placing the top-mounted element into position on a predetermined one of the telescopic sections.

In another variant of the method of the invention used for erecting wind-turbine towers, the eighth step may comprise fitting the wind turbine generator unit to the top of the predetermined telescopic section and fitting turbine blades such that the rotation plane of turbine blades is maintained at an angle from the operational rotation plane of the blades during the lifting subsequently performed in the sixth step, and wherein the method further comprises a ninth step of moving the rotation plane of the turbine blades to their operational rotation plane during or after the execution of sixth step once the predetermined telescopic section has been raised above a height at which the turbine blades, when in their operational rotation plane, are clear of obstructions.

The second step of constructing may comprise assembling the or each coaxial section from a plurality of pre-fabricated segments, and the second step may further comprise fastening the pre-fabricated segments together using tensionable lateral connecting elements.

The sections may be made of any suitable material. However, in a preferred embodiment of the method of the invention, the sections are made of concrete, or a steel-reinforced concrete, or a combination or steel and concrete.

In a further embodiment of the invention, the method further comprising a sequence of dismantling steps including performing some or all of said first to ninth steps in reverse so as to dismantle the structure.

In an alternative embodiment, the first and/or second steps of the method of the invention may comprise providing a mould, former or shuttering, and casting the sections.

The first and second steps may involve a combination of precasting and in situ construction methods. For example, the top and bottom flanges of each segment may be precast remote from site, or on a flat surface adjacent to the construction area. Or the entire bottom flange of each section may be cast in situ. Segment flange parts may be pre-cast with the necessary starter bars in place, ready to be to be embedded into the cylinder or wall part of the segment. The underneath surface of the top flange could be match-cast against the top surface of the bottom flange of the neighbouring segment so as to form a pair of perfectly mating surfaces. During the construction of such a segment, the bottom flange of the section would be positioned first, then the cylinder of that segment would then be cast in place above the bottom flange, then the top flange would be cast in place, or fitted, adjusted and stitched to the top of the wall section of that section. This latter variant eases the construction of the top section, removing the need for a formwork between two sections, which would be difficult to remove after casting. This variant also allows the creation of a perfect contact between the two mating concrete surfaces of the top and bottom flanges at a particular joint, thus improving the quality of the structure or possibly avoiding the need to have an epoxy or high strength mortar to be provided at these joints. The flanges may also be made in composite concrete and steel to improve further the contact area between the mating surfaces of the flanges.

In another embodiment, the method comprises a preliminary step of constructing a foundation for the structure, the foundation having a recessed access area for permitting access to the underside of at least some of the plurality of telescopic sections placed or constructed in the first or second steps.

The invention also provides a pre-fabricated tower segment for joining with one or more other similar tower segments to form a section of the height of a tower structure, the section being for joining with other similar sections to form the tower structure, the tower segment being characterised in that it comprises:
upper jacking points and/or lower jacking points for attaching jacking tendons,
one or more first mating surfaces for fixably engaging with corresponding mating surfaces of the other similar tower segments, segment fastening points for attaching first tensioning means such that the or each first mating surface is tensionably secured to a corresponding mating surface of the other similar tower segments, one or more second mating surfaces for, when the tower segment is fixably engaged with the other similar tower segments to form the section of the height of the tower structure, fixably engaging with corresponding mating surfaces of an adjacent upper and/or a lower section of the tower structure, and section fastening points for attaching second tensioning means such that the or each second mating surface is tensionably secured to a corresponding mating surface of the adjacent upper and/or lower section of the tower structure.

In one embodiment of the prefabricated tower segment according to the invention, the upper jacking points and/or the lower jacking points are implemented as a flange provided at or near an upper and/or lower edge, respectively, of the tower segment, the or each flange comprises openings for tensionably accommodating the jacking tendons.

The invention also provides a tower structure comprising a plurality of pre-fabricated tower segments as described above.

Other objects and advantages of the invention will become apparent from the following description and the accompanying drawings.

The drawings are provided to illustrate example implementations of the present invention, and to aid an understanding of the invention. They do not imply any restriction of the scope of the invention.

Note that, while the example of wind turbine towers is used throughout this application, it will be appreciated that the invention is equally applicable to any tower-like structure.

The invention is not limited to structures having a circular cross-section—any arrangement of approximately coaxial telescopic sections may be erected using the method described in this application.

Figure 1:
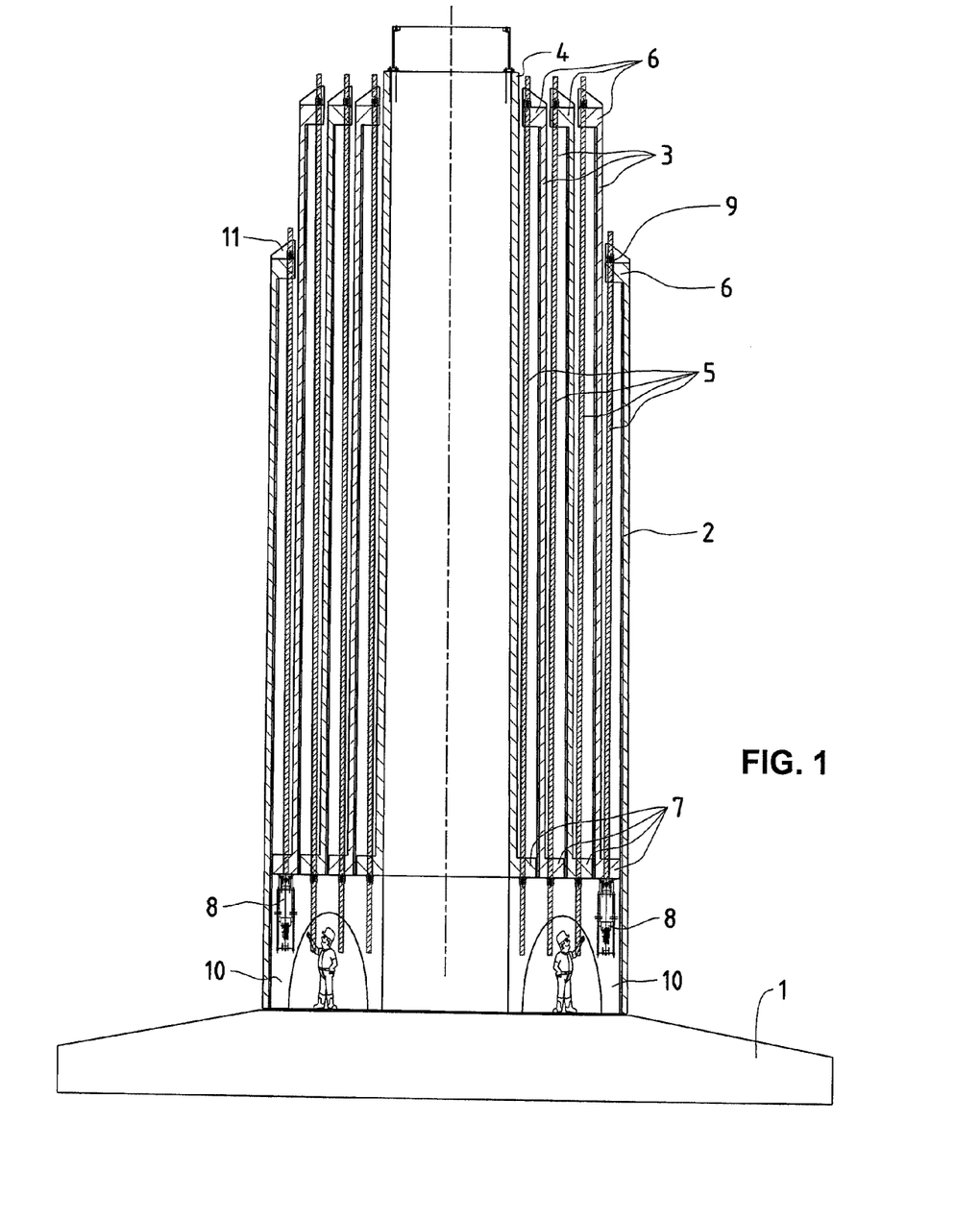
FIG. 1 of the drawings shows a sectional view of a telescopic tower assembly according to the present invention.

In FIG. 1, we see in schematic cross-section a tower comprising five coaxial sections: an outer section 2, three mid-sections 3 and an inner section 4. The various sections 2, 3 and 4 are each depicted already assembled and in position, ready for erection. The outer section 2 is supported on a foundation 1, while the mid and inner sections 3 and 4 are supported in a slightly raised position, resting on support 10. This is to provide space under sections 3 and 4 for attaching jacking tendons 5 and hydraulic stroking jacks 8. Note that the same result can be achieved by means of a suitable space (for example by excavation) in the tower foundation 1—in this case the mid- and inner sections 3 and 4 do not need to be raised, and the height requirement for the assembly crane may thereby be still further reduced.

FIG. 1 shows the sections all having the same height, however the sections may be of different heights, dependent on the requirements of the particular structure being erected. In one preferred variant, some or all of the sections to be raised can be somewhat shorter than the section which is not raised. This allows for a support 10 underneath the sections, as already mentioned, to allow space which can be used for installing jacks etc, without the need to make such a space in the foundation. At the same time, the tops of all the sections can be more or less level with each other, so as to allow the use of a small crane the height of just one section (or slightly taller).

The mid and inner sections 3 and 4 are shown ready to be raised by the hydraulic jacks 8 in FIG. 1. The stroking jacks 8 (also known as crawler or reciprocating jacks) may be of the kind used to stress tendons in post-tensioned (PT) structures or cables for supporting bridge decks. The tendons 5 may each be any kind of elongated structure, such as cable or bar, which is sufficiently strong in tension to bear the combined weight of the supported sections 3 and 4, distributed over the number of tendons 5 present, and along which a stroking jack can crawl. In the example shown in FIG. 1, each tendon is connected from a flange 7 at the bottom of one section to a flange 6 at the top of the neighbouring section. In the example, the tendons 5 connecting the flange 6 at the top of the outer section 2 to the flange 7 at the bottom of the first mid section 6 will be required to bear the weight of all three mid sections and the inner section, as well as the weight of all the tendons 5 and the jacks 8. Anchors can be used to support the structure until the jacks are positioned and tensioned to take the weight, ready for lifting.

Note that, in the example depicted in the figures, the innermost section is raised to form the uppermost part of the structure, while the outer section forms the lowest part. However it should be understood that the method of the invention also applies when the order of the sections is reversed, such that the innermost section forms the lowest part of the finished structure, with successive outer sections being raised to form successive upper parts of the structure. This reversed arrangement will be described in more detail with reference to FIG. 15.

Note also that the sections shown in FIG. 1 are depicted all having a similar height. The sections may of course be of different heights.

Figure 2:
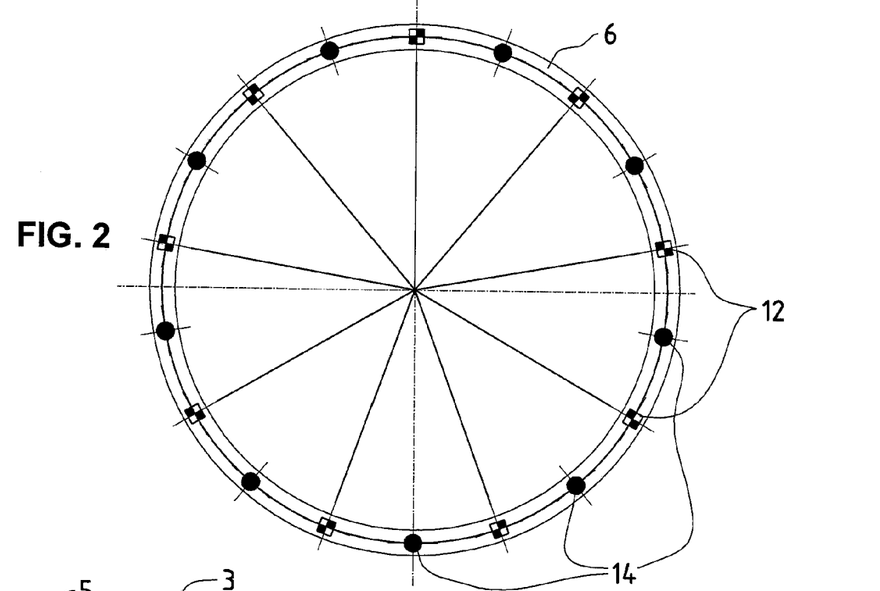
FIG. 2 shows an example distribution of jacking holes and PT-bar holes in one of the section flanges.
Figure 3:
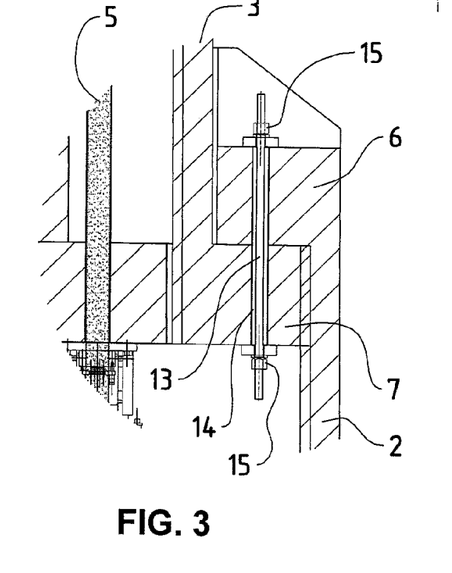
FIG. 3 shows an example of a PT bar used to join two sections.
Figure 4:
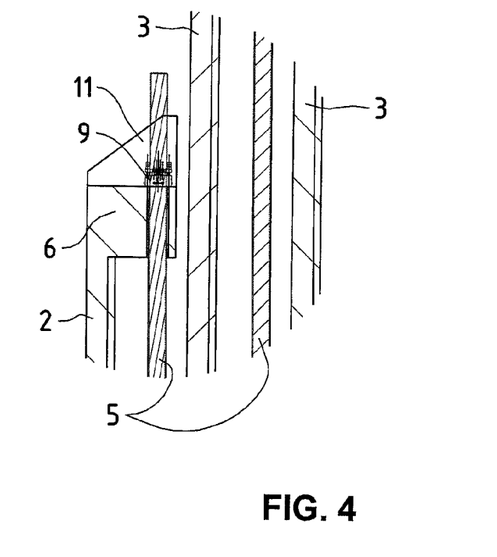
FIG. 4 shows an example of a tendon and anchor used during jacking in the present invention.

FIGS. 2 to 4 show examples of how the jacking tendons 5 and connectors 13 can be distributed around each flange. In the first instance, jacking tendons are inserted through holes 12 in each flange, and used to raise one section 3 relative to its outer neighbour 2 (together with any other sections being supported by the section being raised). The corresponding flanges 6 and 7 of the pair of sections 3 and 2 are designed such that they marry up in their final raised position, whereupon connectors 13 can be inserted through the alternate holes 12 and secured so that the tension in the jacking tendons 5 can be released. The tendons 5 can then, if appropriate, be removed. The arrangement shown in FIGS. 2 to 4 is just one arrangement among many which could be used for carrying out the method invention. It is possible to use the same set of openings first for the jacking tendons 5 and then for the connecting bars 13. In this case, once the section 3 has been raised into position, the jacking tendons can be gradually removed, with a connector 13 being fixed in place of each jacking tendon 5.

Reciprocating crawler jacks operate in a cyclic way, with a lifting stroke followed by a climbing stroke. In the case of hydraulic crawler jacks, each jack is supplied with hydraulic fluid under pressure from a hydraulic pump, and under control of a control unit. There may be two, three, or as many as sixteen or more jacks for lifting a whole section. Each jack may be operated individually, or they may be operated in groups, with the jacks in each group being supplied by a common hydraulic source (pump and control unit).

The jacks in one group may be physically adjacent to each other on the section being lifted, or they may be distributed around the structure. For example, if twelve jacks are used, they may be operated as four groups of three jacks, with each three jacks in each group being separated from each other by approximately 120°. In this way, the control of the lifting may be improved, and the risk of overloading one jack would be reduced. Alternatively, the twelve jacks of the example may be divided into three groups of four adjacent jacks, with each group of four jacks being controllable as though it were one jack, but with the load distributed over four tendons. By dividing the lifting control into three sectors, it is possible to improve the control, and therefor the stability, of the section as it is being raised.

The connectors 13 may for example be lengths of high-tensile steel bar, or they may be lengths of multi-strand cable or any other shape or material suitable for maintaining high tensile force between the mating flanges. FIG. 3 shows an example of how such a bar might be fitted: mating flanges 6 and 7 are clamped together by tensile bar 13. The bar may be threaded, with the tension being achieved by the tightening of nuts on the thread. Alternatively, the connecting bar/cable may be fixed using anchors, for example similar to those used in post-tensioning tendons, and tensioned using hydraulic jacks.

Note that the arrangement of mating or abutting flanges depicted in the drawings is just one of many possible ways of implementing jacking and fixing points on the sections.

The connector bar 13 in FIG. 3 is depicted as having a cover or seal. In many environments it is advantageous if the connector is protected from the potentially corrosive effects of damp, for example. A seal may also be provided between the inner surface of one section and the outer surface of its neighbour, so as to prevent water penetration. In one advantageous variant of the invention, a captive nut or anchor is pre-fitted in the section during manufacture, so that the connector 13 can simply be inserted and, in the case of a threaded bar and a captive nut, threaded into the nut to the desired depth.

If tendons are used for the connectors 13, then the tendons can be fixed using pairs of anchors and then tensioned using hydraulic tensioning jacks, in the same way as post-tensioning tendons are usually stressed. FIG. 4 shows how an anchor 9 can be used at the top of a jacking tendon 5. Such anchors are commonly used for holding post-tensioning cables in the stressing of concrete structures. In this case, the anchor may be fitted to the cable during assembly of the section 2, or it may be pre-fitted during the pre-fabrication of the section 2, so that the on-site procedure involves merely inserting a tendon into the opening 12 and engaging the anchor 9. Alternatively, the tendons used for raising the sections may then be tensioned and anchored so as to form the connectors. The surplus lengths of tendon could then be cut off or left attached and rolled up, so that the same tendons could be used again later, for example for lowering the sections again during maintenance or disassembly operations.

Note that, in the examples depicted in the figures, the jacking tendons 5 are arranged such that the crawler jacks 8 are at the lower end of each jacking tendon 5, and the anchors 9 at the top of each jacking tendon 5. This arrangement could be reversed, with the anchors 9 at the bottom of the sections 2, 3, 4 and the jacks 8 at the top, without departing from the invention.

Figure 14:
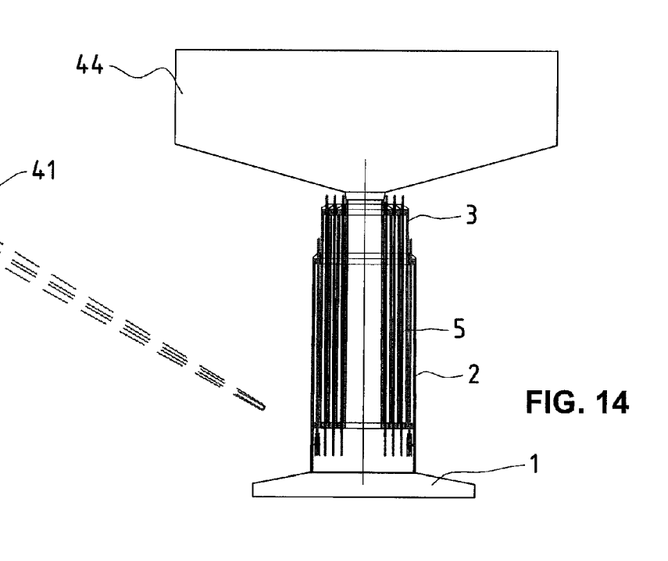
Figure 15:
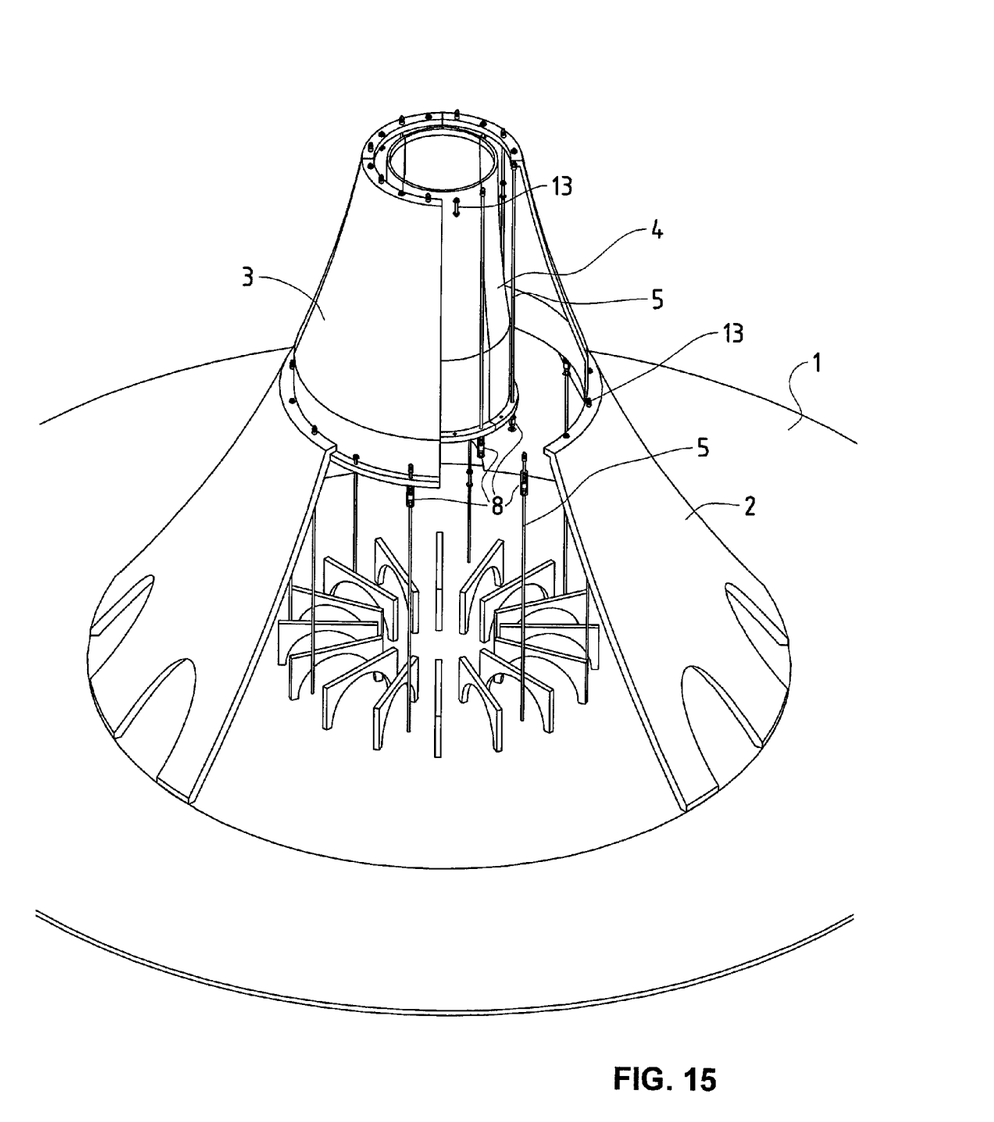
FIG. 15 shows a tower having non-parallel walls, being erected by the method of the invention.

We refer in this application to the construction or assembly of telescopic sections in position on site. This can mean, for example, assembling each section from pre-fabricated segments, or it can mean casting the sections whole in situ. In either case, the sections are assembled/constructed in an assembly sequence of substantially coaxial sections, from the inner to the outer section, such that each successive section to be constructed (assembled from segments or cast in situ, for example) is constructed around the previously constructed sections. In this way, no section needs to be lifted over any previously constructed sections, and there is ample unobstructed working space for assembling or constructing each successive section. The sections thus assembled or constructed are then raised into their destination positions relative to one another using the crawler jacks. In the case where the innermost section is destined to form the uppermost part of the tower, the order in which the sections are raised is advantageously the reverse of the order in which the sections were assembled or constructed. However, the sections can in principle be raised in any order by making appropriate modifications, for example to the lengths of the tendons. Each section to be raised is raised relative to its neighbouring section (its outer neighbour in the case where the sections are arranged inner-to-outer as shown in FIGS. 1, 7, 8, 14 etc., or its inner neighbour in the case where the sections are arranged outer-to-inner as shown in FIG. 15), and such that the weight of the section is supported on the neighbouring section.

Figures 5, 6:
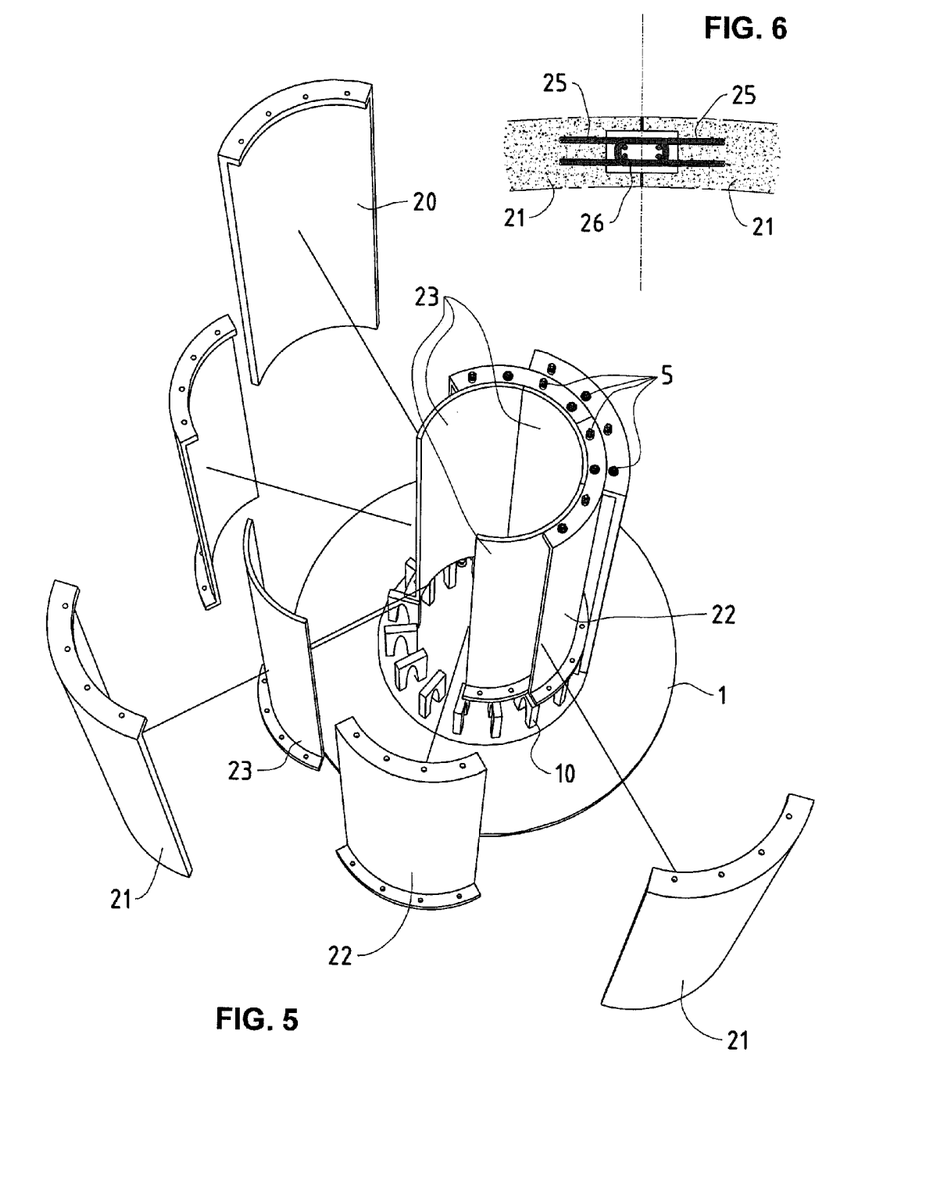
FIG. 5 shows an exploded view to illustrate how the successive tower sections are assembled.
FIG. 6 shows an example of a connecting structure for joining neighbouring segments of a tower section.

FIG. 5 shows an exploded view of an example of the method and assembly of the invention. Each of the tower sections 2, 3, 4 which together will make up the height of the tower, is constructed or assembled from several segments 21, 22, 23. Each segment is prefabricated having the necessary jacking and fixing points (flanges with holes 12).

In the example shown in FIG. 5, the coaxial sections which make up the tower structure are assembled from the inner section outwards, with each section being made up of several segments. The innermost section is shown as being assembled from four segments 23, the next outer section as being assembled from four segments 22, and the outermost section as being assembled from four segments 21. By assembling the segments from the inside outwards, each segment can be positioned without needing to be lifted over other, already installed segments. The crane required for lifting the segments into position need only be a little taller than the tallest segment to be lifted. Note that it is not necessary for the innermost section to be constructed from several segments, since this section can in any case be lifted into place directly, without obstruction.

The number of segments in each section can be chosen to suit the shape and load bearing requirements of the tower structure, as well as the constraints on transporting the segments to the assembly site. Each of the segments is joined to its adjacent segment(s). In order to achieve a high load-bearing structure, for example, the segments may be provided with integral hoops or staples 25, as shown in FIG. 6. The hoops of each segment overlap and interlock with hoops of the adjacent segment such that, when a locking bar or frame 26 is driven down through the overlapping and interlocking hoops, the segments are locked and held together in tension.

Other methods of joining the segments together are possible, and will be familiar to the person skilled in the art. In one embodiment of the invention, the sections may be cast in situ, from concrete for example, instead of being assembled from multiple segments. In this case, the interlocking hoop arrangement would not be necessary.

Figure 7:
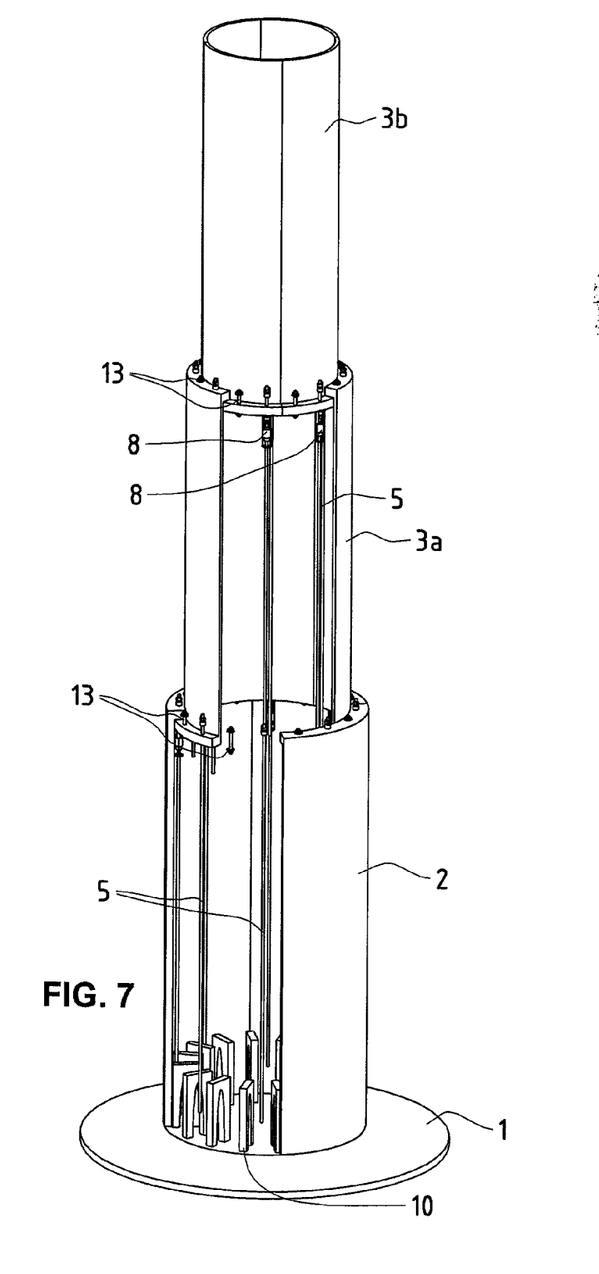
FIG. 7 shows a cut-away view of the final erection stages of a tower having three sections.

FIG. 7 shows a cut-away view of the assembly of FIG. 5 in its erected state. Each of the sections 2, 3a and 3b is composed of several segments, as in FIG. 5, and jacking tendons are fitted between the upper and lower fixing points (flanges) of each pair of adjacent sections (2 and 3a, 3a and 3b in this case. Note that the outermost section 2 can be made without any lower jacking points, and the innermost section 3b can be made without any upper jacking point. Alternatively, the outermost 2 and innermost 3b sections can be made with both upper and lower jacking points (top and bottom flanges). The lower flange on the outermost section 2 may then be used for securing it to the foundation 1, and the upper flange on the innermost section may be used to secure an element such as a water-tank or a wind turbine generator unit to the top of the tower.

The cut-away view of FIG. 7 also shows how the tendons 5 and the jacks 8 can be positioned for lifting the sections 3a and 3b. In the position shown, the sections are in their lifted state—the connector elements 13 have been at least partially fitted, and some or all of the jacks 8 may be removed. The tendons may also be detached and removed to be used elsewhere.

Figure 8:
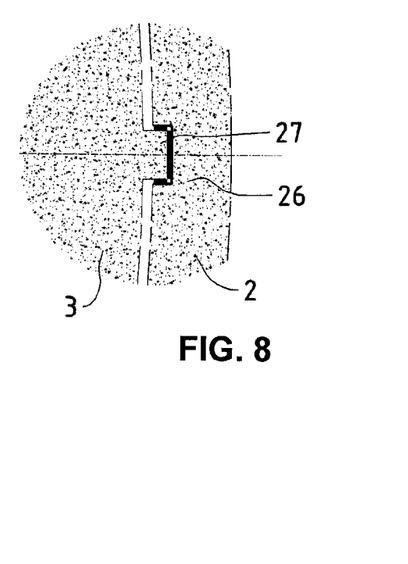
FIG. 8 shows a detail of a possible guiding mechanism for neighbouring sections.

FIG. 8 shows an example of a vertical stabilising rib 27 and corresponding groove 26 combination implemented between two adjacent sections 2 and 3. This arrangement can prevent the sections 2 and 3 from rotating relative to each other about a vertical axis. Such a rotational motion may be caused, for example, when raising a tower in windy conditions, with a large wind-turbine generator unit on top, and may give rise to unacceptable additional stress on the structure and/or on the tendons during lifting, particularly if a resonant motion is induced.

Figure 9:
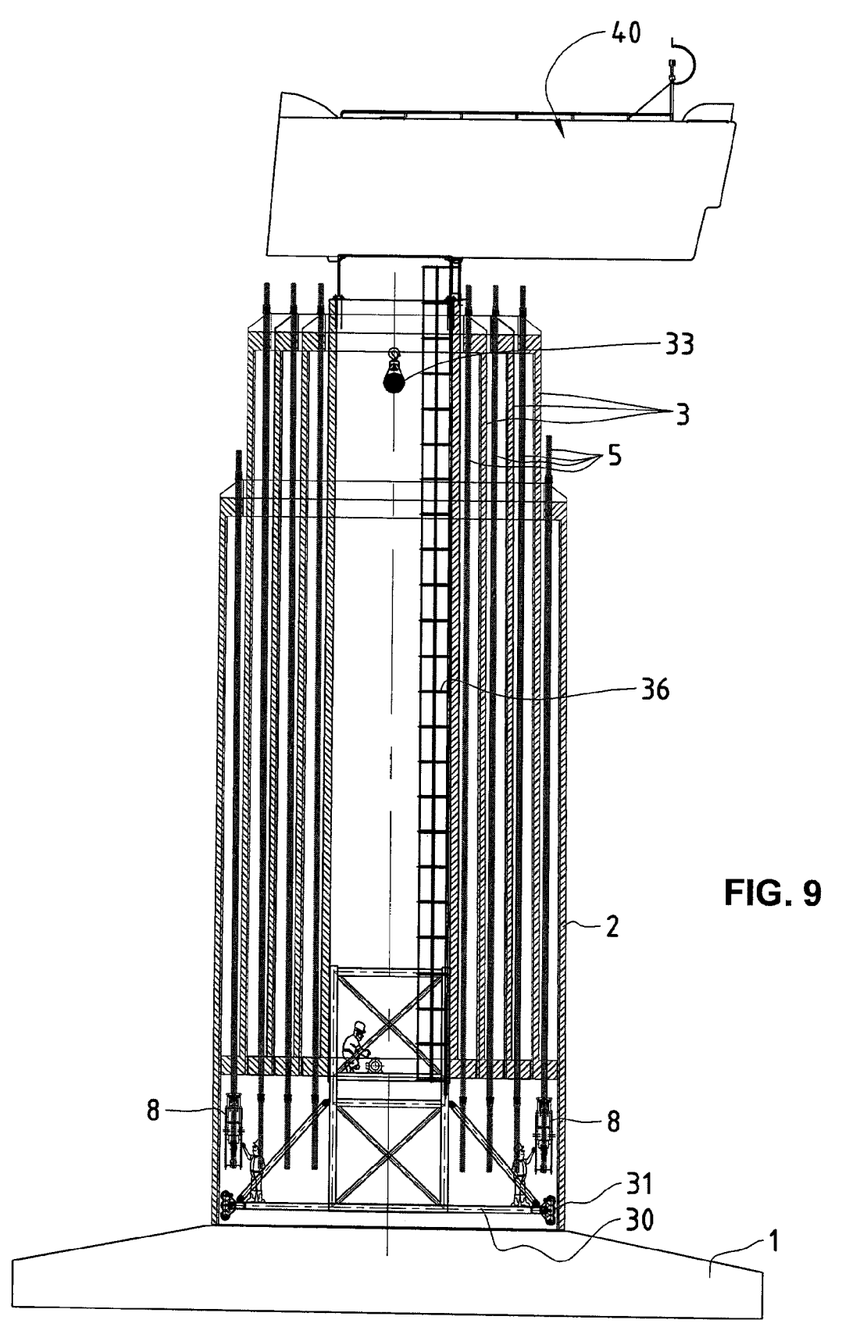
FIG. 9 shows a sectional view of a telescopic tower assembly before the raising process begins, and with the generator already mounted.

FIG. 9 shows in sectional view a tower assembly according to the invention. The example shown has five coaxial sections (labelled 2, 3, 3, 3 and 4), and supports a nacelle (wind-turbine generator unit) 40. In particular, FIG. 9 shows the use of a working platform 30 secured to innermost section 4. Platform 30 not only provides a convenient working area which rises with the sections as they are lifted, but it also provides a support for jacks when they are being transferred from one set of tendons to the next. The platform shown in FIG. 9 also has the function of stabilising the structure while it is being elevated. Until the sections 2, 3, 4 are all secured to each other with the respective connector elements 13, the tower structure is relatively unstable, since each unfixed section is only supported by the jacking tendons 5. By making the platform as wide as the inner dimension of the tower structure, and by equipping it with wheels or guides so that it can be in continuous mechanical contact with the inner surface of the section 2, the platform can be used to give mechanical stability to the tower structure as it is being raised. The width of the platform (or at least the distance between the wheels 31 on opposite sides of the platform) can be made adjustable to allow for the varying width of the inside of the tower as the platform progresses up the inside of the tower. A ladder 36 is also illustrated on the inside of the tower—sections of ladder 36 may be added to the inside of each section once it is raised into position.

Figure 10:
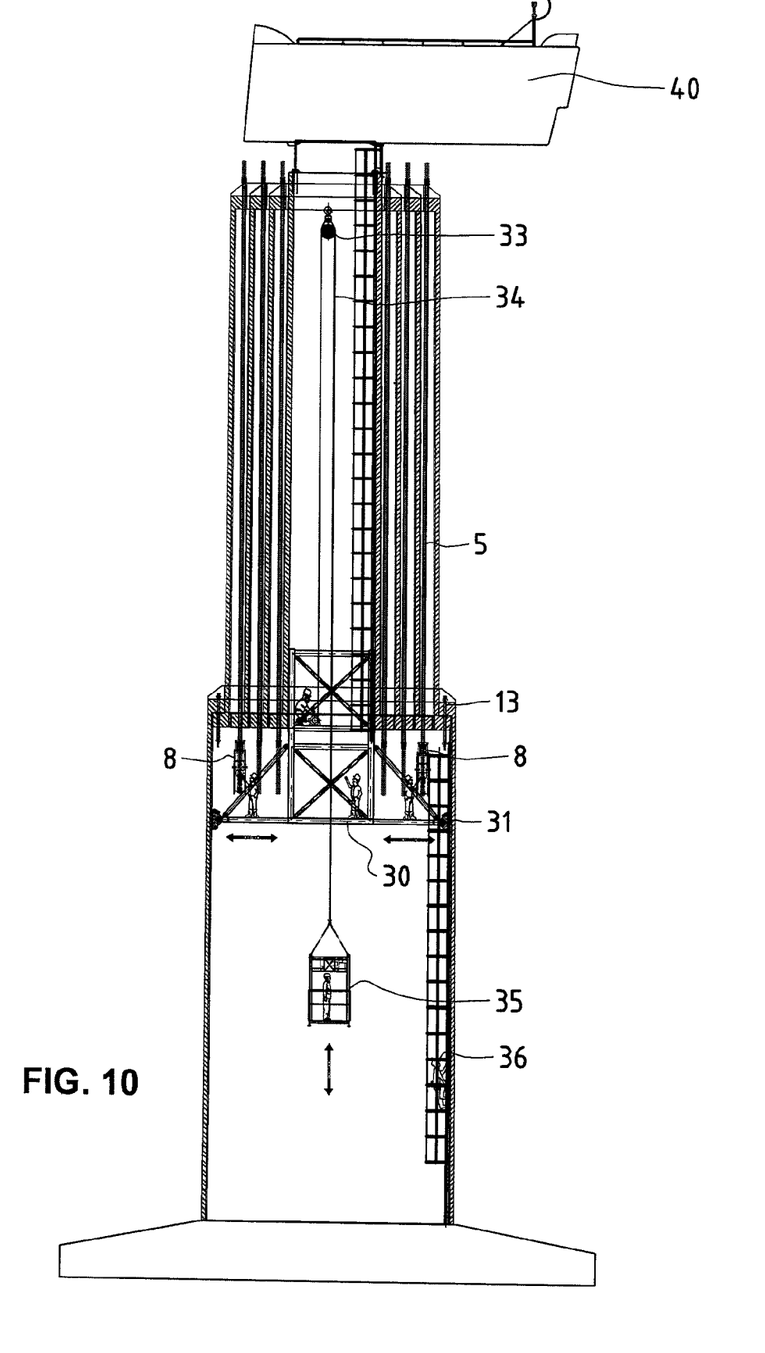
FIG. 10 shows an example of a working platform arrangement inside a tower.

A pulley arrangement 33 may also be provided for lifting equipment or people up and down inside the tower which it is under construction. This pulley arrangement 33, the platform 30 and the ladder 36 are more clearly illustrated in FIG. 10, which also shows the use of a cage 35 for transporting people and equipment up and down inside the tower. The same winch and pulley arrangement can also be used to lower the platform when the erection of the tower is complete. The hook is secured to the top of the platform or cage 30, and the platform can then be released from its location attached to the innermost section, and then be lowered to ground level where it can be dismantled and taken off site.

An important advantage of the invention is that it permits the erection of a tower of unlimited height with the use of relatively small scale lifting equipment such as a small crane capable of reaching just slightly above the height of one section.

Figure 11:
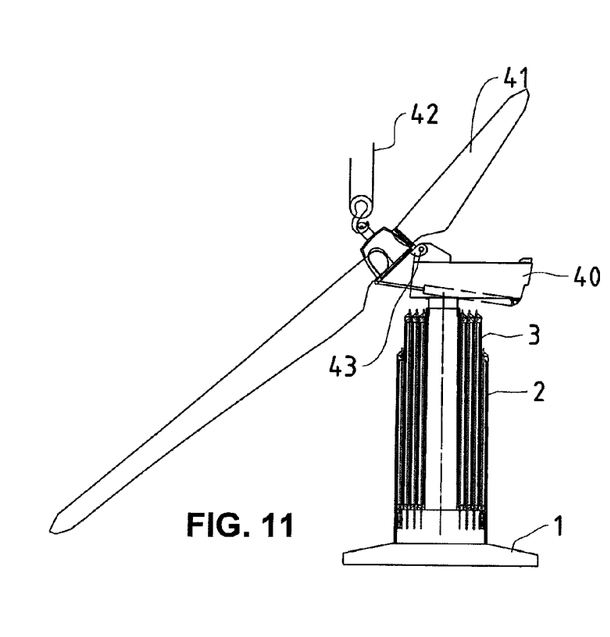
FIG. 11 shows a lateral view of a telescopic tower arrangement to which the generator and rotor are added before the tower is raised.
Figure 12:
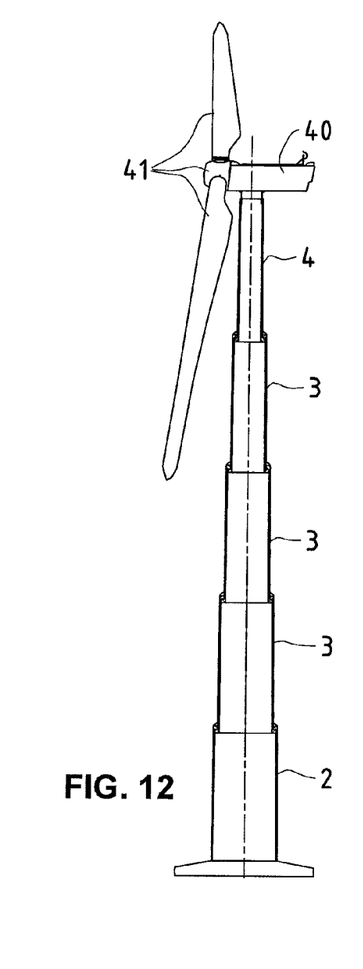
FIG. 12 shows the telescopic tower of FIG. 10 in its extended state.
Figure 13:
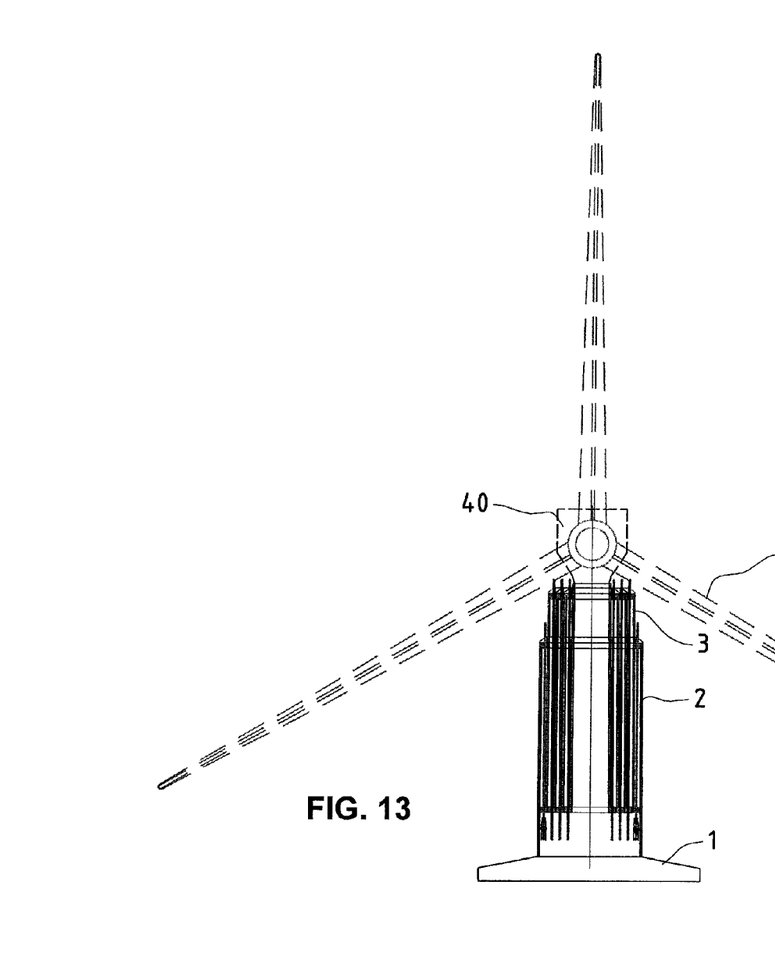
FIGS. 13 and 14 show lateral views of a rotor and a water reservoir respectively, both mounted on the telescopic tower at low level before extending the tower.

FIGS. 11 and 12 show how this advantage can be used in the erection, for example, of a wind turbine. In FIG. 11, the tower is in its un-erected state, and the wind-turbine generator 40 has been lifted into position on top of inner section 4. A crane 42 can be used for this purpose. The crane 42 is also used for lifting the turbine blades into position and attaching them before the tower is erected to its full height. Thus all work can be carried out at a relatively low level (at about the height of one section). When the tower is sufficiently raised to allow it, the blades can then be rotated to their operating orientation as depicted in FIG. 12. FIG. 11 shows the turbine blade assembly as hinged on the generator unit (nacelle). However, it will be appreciated that this is just one possibility for enabling the tilting of the blades during lifting. In some cases, depending on the relative dimensions of the blades and the tower sections, it may not be necessary to tilt the plane of the turbine blades in order to mount them at low level (ie at the height of one tower section). FIG. 13 shows a frontal view of a three-bladed turbine in position on an un-erected telescopic tower, and shows how the blades do not reach the ground. FIG. 14 shows the application of the principle of assembly at low level to the erection of a water tower. Water tank 44 is mounted and secured to the topmost tower section before the tower is erected.

Note that, because the method of the present invention is reversible, the wind-turbine generator 40, water tank 44 etc can be lowered to the low level again in future so that maintenance work can be carried out which would otherwise have to be carried out at the top of the tower.

Figure 16:
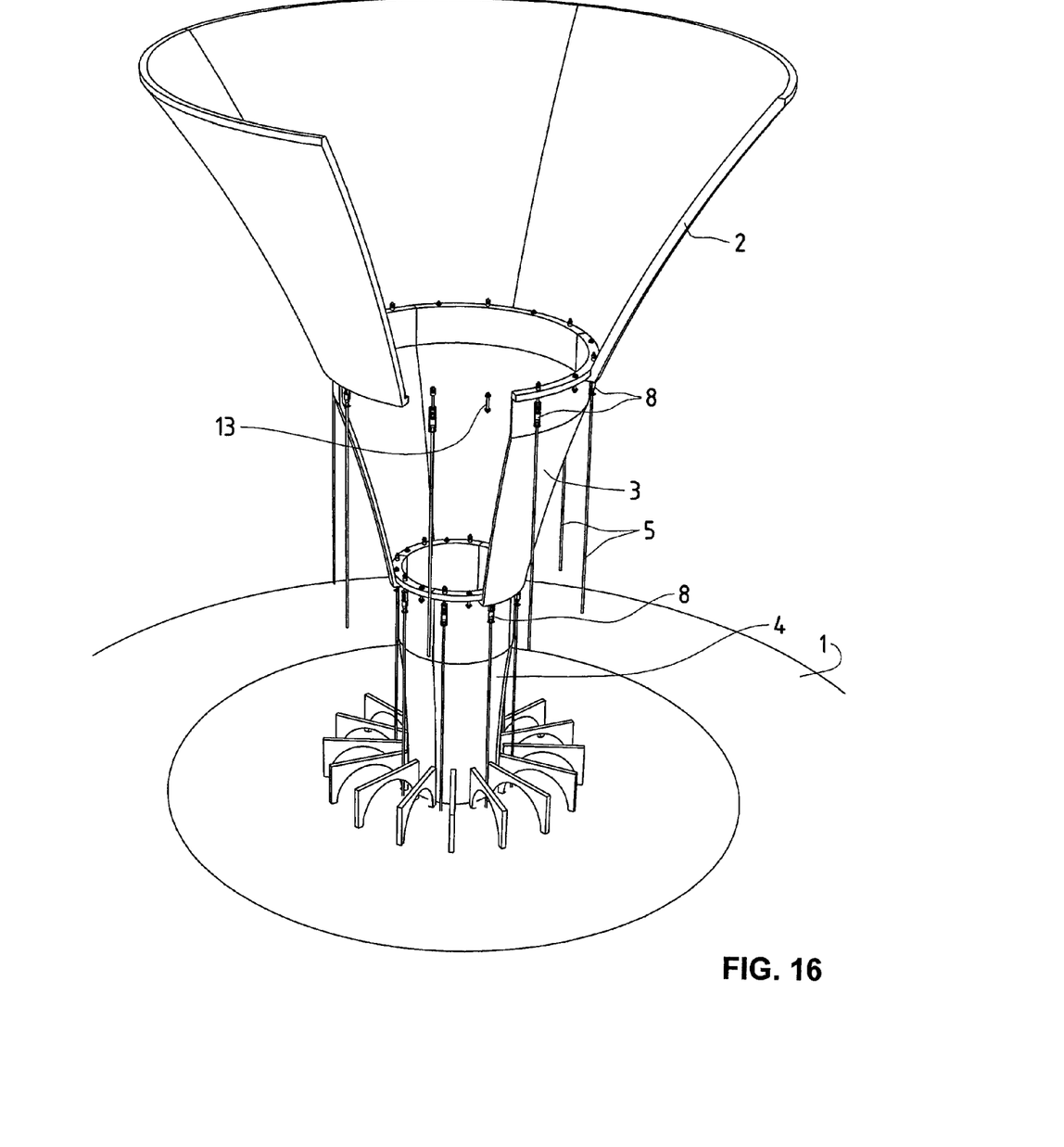
FIG. 16 shows an alternative example of a tower having non-parallel walls, being erected by the method according to the invention.

FIGS. 15 and 16 show cut-away views of how the method of the invention can be applied to telescopic sections having significantly non-parallel walls. In fact, as long as each pair of adjacent sections (2 and 3, or 3 and 4) have openings which are aligned, and can be secured together, and as long as the sections fit one within another, each section can have more or less any shape. In both the examples depicted in FIGS. 15 and 16, the tower structure has three sections which are initially assembled such that they are coaxial and nested at ground level, then raised using hydraulic jacks until they are in position, then secured using connector bars or tendons 13. In the example shown in FIG. 15, it is the innermost section which rests on the foundations 1, while the outermost section is raised to become the uppermost section. The assembly of the sections, and the jacking and the fastening operations, however are the same as those used in FIG. 15 and the previous figures.

The invention claimed is:

1. Method of erecting a structure on a site using a plurality of substantially coaxial telescopic sections,
the method being characterized in that it comprises:
a first step of placing or constructing an innermost one of said plurality of sections in position on the site such that said innermost section extends along a vertical axis,
a second step of placing or constructing, in position on site, one or more substantially coaxial sections around said innermost section, wherein said placing or said construction of said one or more coaxial sections occurs in an assembly sequence such that each successive section is placed or constructed so as to extend along said vertical axis around the previously placed or constructed section, so as to form two or more substantially coaxial telescopic sections, each of said coaxial telescopic sections having an inner and/or an outer coaxially adjacent section,
wherein a base of said innermost section is substantially planar to a base of at least one of said coaxial sections,
a third step of fitting a plurality of jacking tendons between lower jacking points of a first one of said coaxial sections, and upper jacking points of a second one of said coaxial sections, said first and second coaxial sections being coaxially adjacent,
a fourth step of attaching a tendon jack to one or more of said plurality of jacking tendons,
a fifth step of operating the tendon jacks to apply tension to the jacking tendons such that the weight of the first coaxial section is supported by the upper jacking points of the second coaxial section, and
a sixth step of operating said tendon jacks to lift the first coaxial section with respect to the second coaxial section.

2. Method according to claim 1, further comprising a seventh step of securing a lower part of the first coaxial section to an upper part of the second coaxial section.

3. Method according to claim 1, wherein
the second step is performed so as to form three or more substantially coaxial telescopic sections comprising two or more pairs of coaxially adjacent sections,
the third to sixth steps are performed for each of the two or more pairs of coaxially adjacent sections.

4. Method according to claim 1, wherein the structure is a tower for supporting a top-mounted element on an uppermost one of the telescopic sections, and wherein the method further comprises an eighth step, performed before the sixth step, of placing the top-mounted element into position on a predetermined one of the telescopic sections.

5. Method according to claim 4, wherein the top-mounted element is a wind-turbine generator unit.

6. Method according to claim 5, wherein the eighth step comprises fitting the wind turbine generator unit to the top of the predetermined telescopic section and fitting turbine blades such that the rotation plane of the turbine blades is maintained at an angle from the operational rotation plane of the blades during the lifting subsequently performed in the sixth step, and wherein the method further comprises a ninth step of moving the rotation plane of the turbine blades to their operational rotation plane during or after the execution of sixth step once the predetermined telescopic section has been raised above a height at which the turbine blades, when in their operational rotation plane, are clear of obstructions.

7. Method according to claim 6, the method further comprising a sequence of dismantling steps including performing some or all of said first to ninth steps in reverse so as to dismantle the structure.

8. Method according to claim 1, wherein the second step of said constructing comprises assembling the or each coaxial section from a plurality of pre-fabricated segments so as to extend along said vertical axis.

9. Method according to claim 8, wherein the second step further comprises fastening the pre-fabricated segments together using tensionable lateral connecting elements.

10. Method according to claim 1, wherein the sections are made of concrete.

11. Method according to claim 1, wherein the first and/or second step of said constructing comprises providing a mould, former or shuttering, and casting the sections while in an orientation so as to extend along said vertical axis.

12. Method according to claim 1, further comprising a preliminary step of constructing a foundation for the structure, the foundation having a recessed access area for permitting access to the underside of at least some of the plurality of telescopic sections placed or constructed in the first or second steps.

13. Method according to claim 1, wherein said upper jacking points and/or said lower jacking points are implemented as a flange provided at or near an upper and/or lower edge, respectively, of at least one of the coaxial sections and said innermost section, and wherein the or each flange comprises openings, comprising tensionably accommodating the jacking tendons in the openings.

14. Method according to claim 1, wherein said third step includes fitting a plurality of jacking tendons between lower jacking points of said innermost section, and upper jacking points of said first one of said coaxial sections, said first and said innermost coaxial sections being coaxially adjacent, said fourth step includes attaching said tendon jacks to said plurality of jacking tendons, said fifth step includes operating said tendon jacks to apply tension to the jacking tendons such that the weight of said innermost section is supported by the upper jacking points of said first coaxial section, said sixth step includes operating said tendon jacks to lift said innermost section with respect to said first coaxial section, and securing said lower jacking points of said innermost section to said upper jacking points of said first coaxial section.

15. Method according to claim 1, including securing a platform to said innermost section, said platform including wheels or guides that are in continuous contact with an inner surface of one of said coaxial sections, and adjusting one of said platform and said wheels or guides to allow for varying width of the inside of the structure as the platform progresses up the inside of the structure when said innermost section is lifted.

* * * * *